(No Model.) 3 Sheets—Sheet 1.
C. M. HOLDEN.
COMPUTING WEIGHING SCALE.

No. 503,931. Patented Aug. 22, 1893.

WITNESSES:
H. A. Hall.
H. Brown.

INVENTOR:
C. M. Holden
by
Might, Brown & Quinsby
Attys.

(No Model.) 3 Sheets—Sheet 2.
C. M. HOLDEN.
COMPUTING WEIGHING SCALE.
No. 503,931. Patented Aug. 22, 1893.
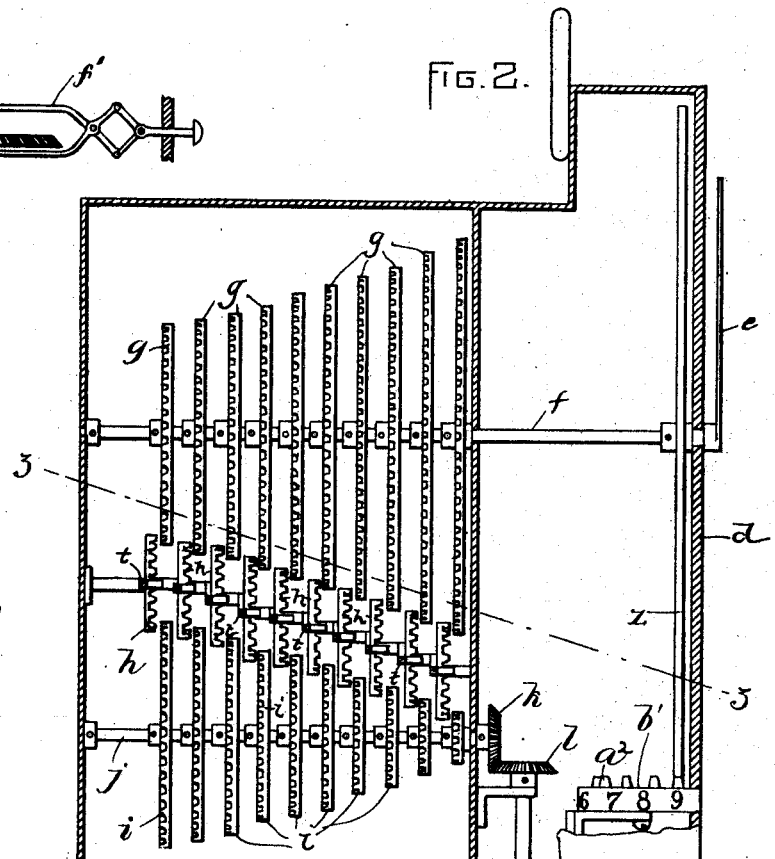
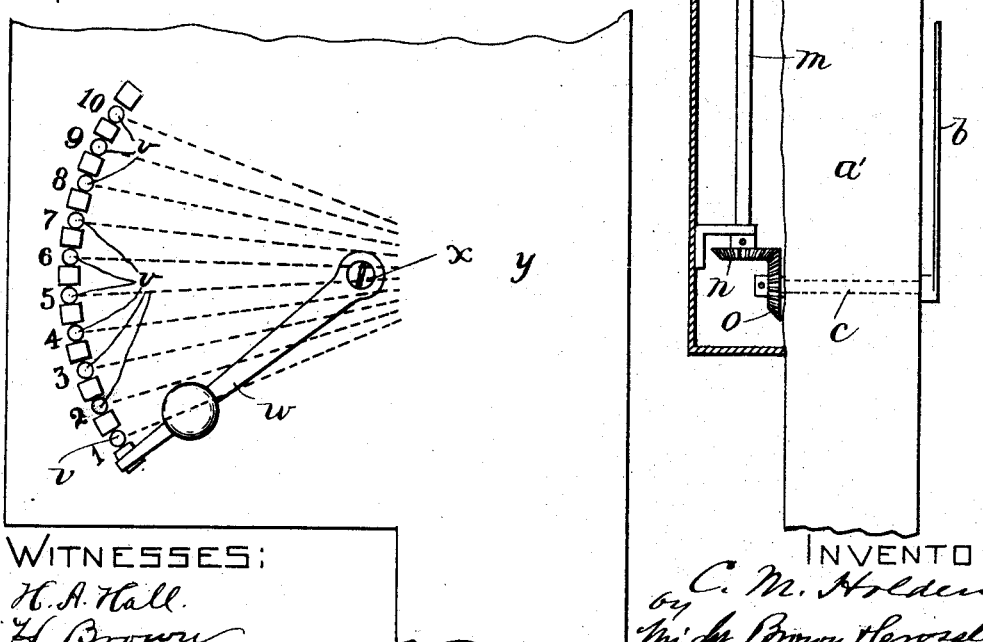
Witnesses:
H. A. Hall.
H. Brown
Inventor:
C. M. Holden
by Brown Hersey (No Model.) 3 Sheets—Sheet 3.

C. M. HOLDEN.
COMPUTING WEIGHING SCALE.

No. 503,931. Patented Aug. 22, 1893.

WITNESSES:
H. A. Hall
H. Brown

INVENTOR:
C. M. Holden
by Brown & Crossley
Attys

UNITED STATES PATENT OFFICE.

CUMMINGS M. HOLDEN, OF TREMONT, MAINE, ASSIGNOR OF ONE-HALF TO EUGENE M. GORDEN, OF EVERETT, MASSACHUSETTS.

COMPUTING WEIGHING-SCALE.

SPECIFICATION forming part of Letters Patent No. 503,931, dated August 22, 1893.

Application filed January 3, 1893. Serial No. 457,135. (No model.)

*To all whom it may concern:*

Be it known that I, CUMMINGS M. HOLDEN, of Tremont, in the county of Hancock and State of Maine, have invented certain new and useful Improvements in Computing Weighing-Scales, of which the following is a specification.

This invention has relation to that kind or class of scales which are provided with means to indicate the cost of an article or thing purchased, as well also as its weight.

It is the object of the invention to provide a spring balance or scale with means which can be readily and quickly adjusted so as to indicate in the usual way the weight of the thing purchased, and at the same time its cost at any particular price per pound.

The invention in its broad sense consists in a computing scale comprising a weight-indicating spring-balance or like mechanism, a cost-indicating mechanism or device, and a plurality of sets of connections between said two mechanisms, arranged to be separately rendered operative, whereby the weight-indicating mechanism may variously actuate the cost-indicating mechanism.

Reference is to be had to the annexed drawings, and to the letters marked thereon, forming a part of this specification, the same letters designating the same parts or features, as the case may be, wherever they occur.

Figure 1:
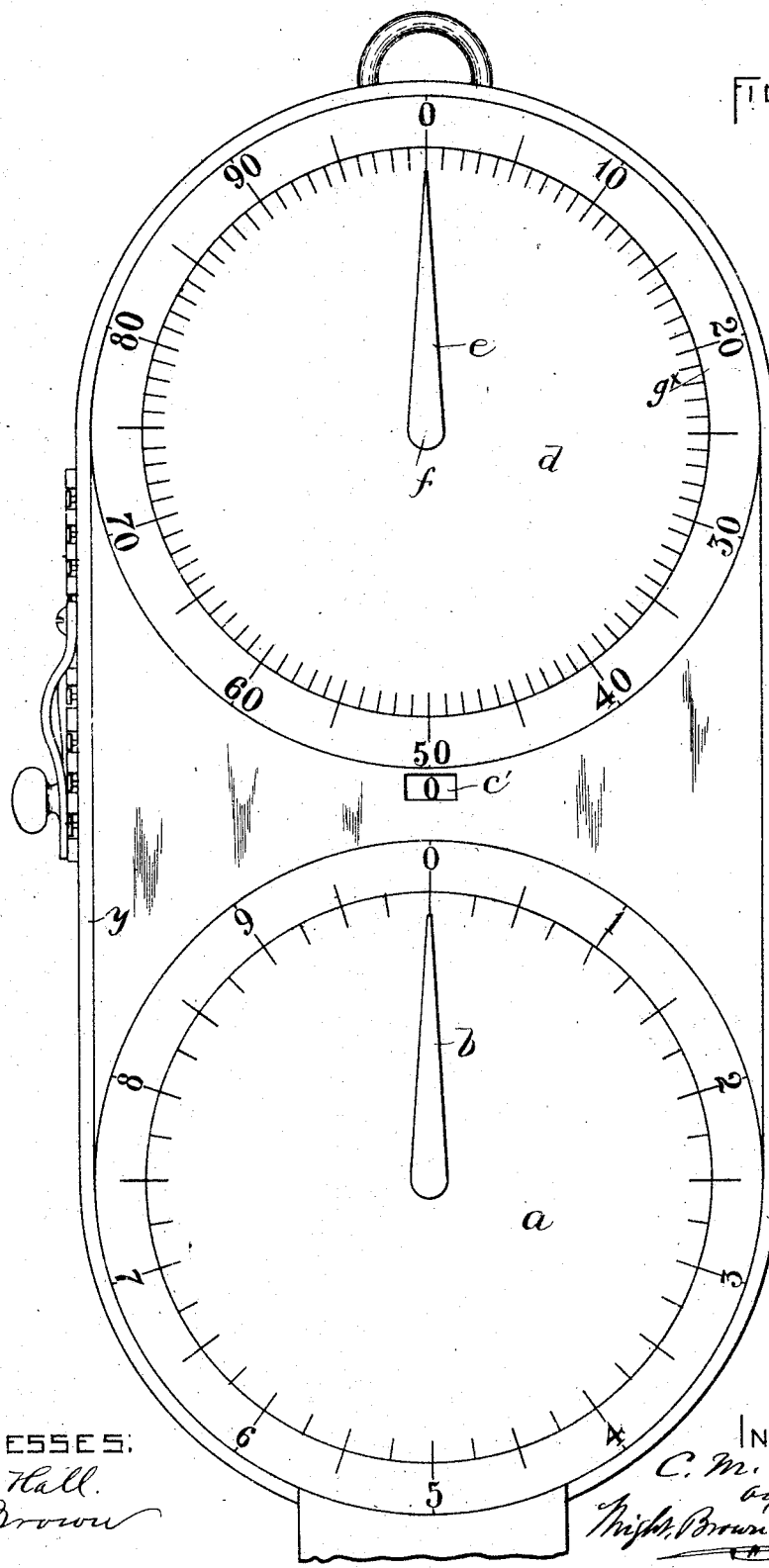
Figure 3:
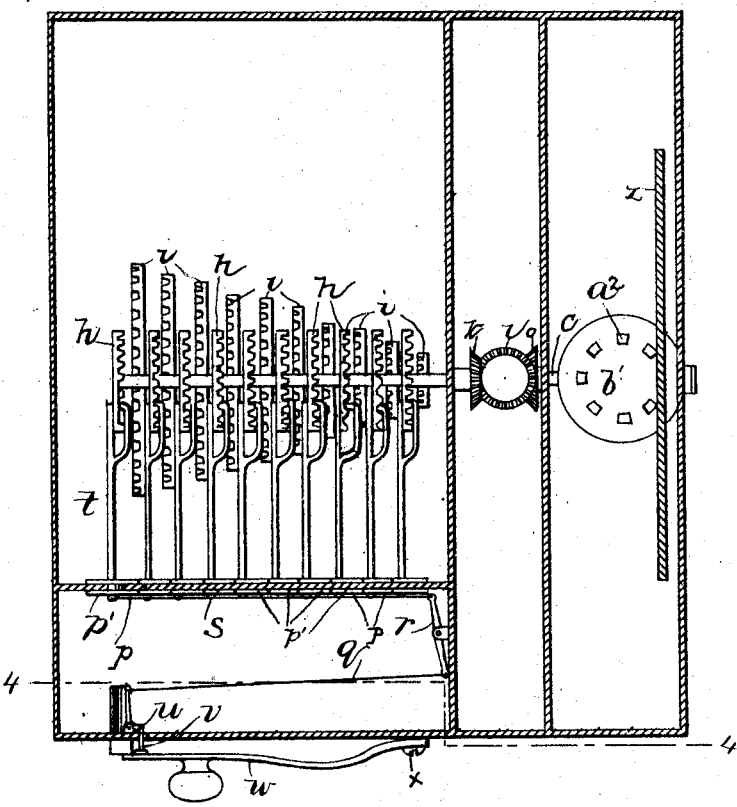
Figure 4:
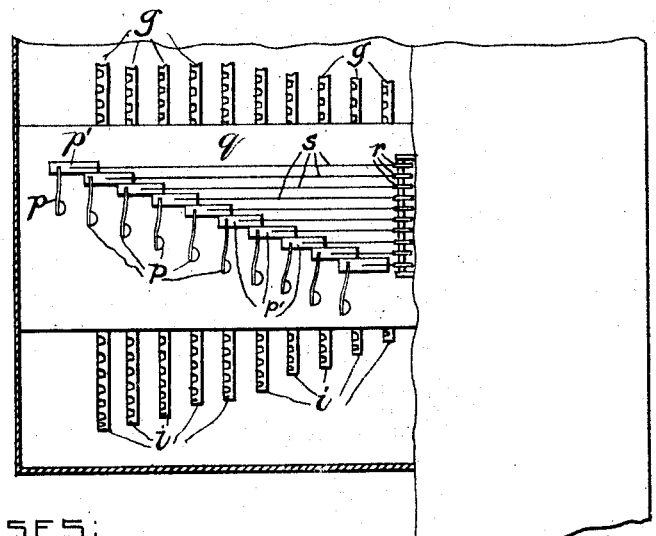

Of the drawings—Figure 1 is a front view of the invention as applied to a spring balance or scale. Fig. 2 is a central vertical sectional view of the particular parts thereof. Fig. 3 is a horizontal sectional view of the invention. Fig. 4 is a sectional view showing the manner of setting the attachment to compute the amount of the purchase. Figs. 5, 6, and 7 are detail views hereinafter particularly referred to and described.

In the drawings $a$ designates the dial or face of a spring balance or scale provided with an indicating hand $b$ secured to the arbor or spindle $c$. The scale proper is inclosed within a casing $a'$ and may be constructed in any suitable or well-known way, it being essential only that it should be so organized as that when a weight is placed in the scale the arbor $c$ and the hand $b$ will be operated.

$d$ designates the dial for indicating the cost of the purchase, which may be arranged above the dial $a$, as shown, or below or to one side of the same.

$e$ is a hand secured on the spindle or arbor $f$, and arranged to be actuated from the arbor $c$ through the medium of any suitable gearing or other devices.

The dial $d$ is provided with a circular scale $g^x$ to which the free end of the hand $e$ may point. It will now be seen that if the hand $e$ should be actuated from the arbor or support for the indicating hand $b$, and that if the extent of movement of the hand $e$ should be regulated or adjusted in accordance with the variation in the price of the article weighed, the hand $b$ on dial $a$ will indicate the weight of the article in the scale, while the hand $e$ on the dial $d$ will indicate the price of the thing purchased.

I have conceived of and employed various ways of regulating the movement of the price-indicating hand relatively to the movement of the weight-indicator $b$, but it may answer the purposes of the present case to describe the means shown in the drawings, in which the arbor $f$ is shown as provided with toothed gears $g$ of varying diameter which are adapted to be engaged and driven through the medium of intermediary gears $h$ which latter are driven by gears $i$ also of varying diameter upon a shaft $j$, or it might be on the arbor $c$ carrying the hand $b$. It is to be noted that the gears $i$ are graded as to their diameter in an order the reverse of the gears $g$, while the gears $h$ are of uniform size. It is to be further noted that the gears $h$ are independently movable on their respective journals or shafts, and are normally held out of engagement with the gears $g$ and $i$.

Upon the shaft $j$, as herein shown, there is a miter gear $k$ which meshes with a miter gear $l$ on the upper end of a vertical shaft $m$, on the lower end of the latter of which there is a miter gear $n$ meshing with a similar gear $o$ on the arbor $c$. Supposing, now, that the innermost and smallest gear on the shaft $j$ has ten teeth while the innermost and largest gear on the shaft $f$ has one hundred teeth, if the innermost intermediary gear $h$ should be brought into mesh with the said innermost gears $i$ and $g$, a complete revolution of the said smallest gear $i$ would revolve the said largest gear $g$ but one-tenth of the way around, so that supposing the gears $k\ n\ l\ o$ to be of the same size, and that the hand on the dial $a$ in a complete revolution would indicate a weight of ten pounds; and, again, supposing the cost of the thing being weighed to be one cent per pound, and that ten pounds of the same were placed in the scale, with the innermost intermediary $h$ in mesh with its adjacent gears, the arbor $c$ and hand $b$ would make a complete revolution indicating on the dial $a$ ten pounds in weight, while the arbor $f$ and its hand $e$ would make but a tenth of a revolution, indicating a cost of ten cents. Again, supposing the outermost gear $i$ on the shaft $j$ to have the same number of teeth as the outermost gear $g$ on the shaft $f$ it will be seen that when the spindle or arbor $c$ and shaft $j$ make a complete revolution, and the outermost intermediary $h$ connects the two outermost gears $g\ i$, the gear $g$ will also make a complete revolution. Now, if the gears last mentioned should be brought into engagement, and the article in the scale should be ten pounds in weight at a cost of ten cents per pound, the hand $b$ on the dial $a$ would indicate ten, as ten pounds, and the hand $e$ on the dial $d$ would indicate one hundred, that is, a hundred cents, or one dollar. With this explanation it will be seen that it is only necessary to vary the diameter of the gears on the shafts $f$ and $j$ or the relative number of teeth therein, and drive the same through intermediaries of uniform size to indicate on the dial $a$ the number of pounds in the scale, and on the dial $d$ the aggregate cost of the same.

Various means may be provided for engaging a particular gear $g$ with a gear $j$ through an intermediary $h$. As is herein shown each gear $h$ is held back out of engagement with its gears $g$ and $i$ by means of a spring $p$ acting upon a slide $p'$, which supports a shipper $t$ engaging the gear $h$. A wire $s$ connects the said slide $p'$ with one end of a lever $r$, the other end of which is connected through the medium of a wire $q$ with the inner arm of a bell-crank lever $u$, the outer arm being provided with a stud or button $v$, adapted to be engaged and pressed down by the free end of a spring lever $w$ pivoted at $x$ on the casing $y$. In this way, by moving the lever $w$ around into engagement with a particular stud or button $v$ any desired pair of wheels $g\ i$ may be engaged and driven.

In Fig. 7 I have shown a fragment of a wheel $g$ or $i$, though any other form of gear wheel suited to the purpose will answer as well.

In order to indicate sums above one hundred on the dial $d$, the shaft $f$ may be provided with a disk or other means $z$ (Fig. 2) having a tooth adapted in each revolution to strike a tooth $a^2$ on a disk $b'$ provided on its periphery with numerals running from 1 to 10 and showing through an aperture $c'$ in the casing, (see Fig. 1) so that in each revolution of the arbor $f$ the indicating disk will be turned one-tenth of a revolution, indicating one dollar through the aperture $c'$.

In order to vary the extent to which the shaft $j$ may be driven from the shaft $m$, I may provide the said shaft $m$ with a supplemental gear $d'$ and the shaft $j$ with a supplemental gear $e'$ said gears differing in size, and provide a shipper $f'$ on the plan of lazy tongs for bringing either the gears $k\ l$ or $d'\ e'$ into mesh, and so vary the extent to which the shaft $j$ may be moved by the movement of the shaft $m$. In this construction, the gears $d'$ and $l$ are splined or feathered on the shaft $m$. These and other variations may be made in the invention without departing from the nature or spirit thereof.

Having thus explained the nature of the invention and described a way of constructing and using the same, though without attempting to set forth all of the forms in which it may be made or all of the modes of its use, it is declared that what is claimed is—

1. A computing scale, comprising in its construction a weight-indicator, a price-indicator, and a plurality of sets of connections between said two indicators and arranged to be separately rendered operative, whereby the price-indicator may be variously actuated from the weight indicator.

2. A computing spring balance or scale comprising in its construction a weight indicator, a price indicator, a series of adjustable gears of varying size for operating the latter indicator from the former, and means for moving or adjusting the gears, as set forth.

3. A computing spring balance or scale comprising in its construction a weight indicator and a price indicator, a series of gears of graduated size connected with the weight indicator, a series of graduated gears, reversely arranged, connected with the price indicator and a series of independently adjustable intermediary gears to connect and drive any two or pair of gears of the first two series mentioned, as set forth.

In testimony whereof I have signed my name to this specification, in the presence of two subscribing witnesses, this 28th day of December, A. D. 1892.

CUMMINGS M. HOLDEN.

Witnesses:
ARTHUR W. CROSSLEY,
HERBERT A. HALL.